United States Patent
Preradovic et al.

(10) Patent No.: US 9,126,662 B2
(45) Date of Patent: Sep. 8, 2015

(54) RELEASE APPARATUS FOR A LOAD ON A DEVICE AND UNDERWATER DEVICE

(75) Inventors: Oliver Preradovic, Berlin (DE); David Mischnick, Berlin (DE)

(73) Assignee: EVOLOGICS GMBH, Berlin (DE)

( * ) Notice: Subject to any disclaimer, the term of this patent is extended or adjusted under 35 U.S.C. 154(b) by 180 days.

(21) Appl. No.: 13/581,779

(22) PCT Filed: Mar. 3, 2011

(86) PCT No.: PCT/DE2011/075034
§ 371 (c)(1),
(2), (4) Date: Nov. 5, 2012

(87) PCT Pub. No.: WO2011/107093
PCT Pub. Date: Sep. 9, 2011

(65) Prior Publication Data
US 2013/0042444 A1    Feb. 21, 2013

(30) Foreign Application Priority Data
Mar. 3, 2010 (DE) .......... 10 2010 010 161

(51) Int. Cl.
*B66C 1/34* (2006.01)
*B63C 7/06* (2006.01)
*B63B 22/08* (2006.01)
*F16B 45/02* (2006.01)

(52) U.S. Cl.
CPC . *B63C 7/06* (2013.01); *B63B 22/08* (2013.01); *F16B 45/025* (2013.01); *Y10T 24/4523* (2015.01)

(58) Field of Classification Search
CPC .............. B66C 1/34; B66C 1/38; B66C 1/36; B63C 11/50; B63C 11/42; B63C 7/06; B63B 23/58; B63B 3/13; B63B 22/08; B64D 1/22; B63G 8/001; B63G 8/16; B63G 8/00; F16B 45/02; F16B 45/06; F16B 45/024; A23B 35/0037; F16G 15/04; Y10T 24/4523
USPC ........ 294/66.1, 82.24, 82.31, 82.33; 114/312, 114/330; 24/601.5, 600.1, 600.3
See application file for complete search history.

(56) References Cited

U.S. PATENT DOCUMENTS

| 1,035,021 A | 8/1912 | Laubeuf |
| 3,063,395 A | 11/1962 | Brown |
| 3,228,332 A | 1/1966 | Snyder |
| 3,358,254 A | 12/1967 | Rupp |

(Continued)

FOREIGN PATENT DOCUMENTS

| FR | 958040 | 3/1950 |
| GB | 2 336 398 | 10/1999 |

*Primary Examiner* — Stephen Vu
(74) *Attorney, Agent, or Firm* — Leason Ellis LLP

(57) ABSTRACT

A release apparatus for a load on a device, in particular on an underwater device, includes a hook device, with which a hook is mounted on a hook-holding device such that it can rotate about a rotational axis and can be displaced between a closed and a released position by rotation about the rotational axis with the aid of a hook actuation mechanism. The apparatus includes a load rest, which is formed on the hook and in which a holding element of the load rests when in the non-released state, and a restricted guidance device, which is configured to guide the load in an ejection direction when released, wherein, when the holding element of the load rests on the load rest, the hook in the closed position is torque-free with respect to a torque exerted by the load on the hook in relation to the rotation about the rotational axis.

9 Claims, 6 Drawing Sheets

(56) References Cited

U.S. PATENT DOCUMENTS

Figure 1:
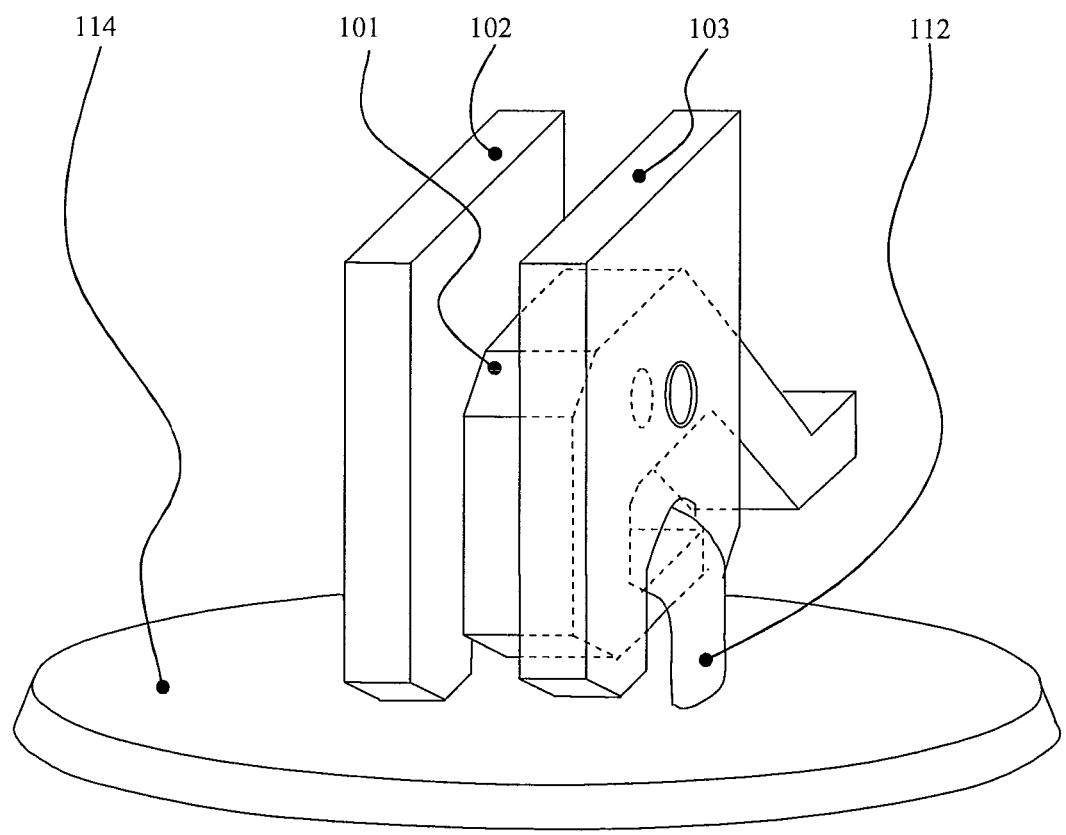

| | | | |
|---|---|---|---|
| 3,463,113 A | 8/1969 | Feyling | |
| 3,504,407 A | 4/1970 | Dawson | |
| 3,577,950 A | 5/1971 | Gordon | |
| 3,609,825 A | 10/1971 | Pullos | |
| 3,626,821 A * | 12/1971 | Gendron | 493/216 |
| 3,749,933 A | 7/1973 | Davidson | |
| 3,848,226 A | 11/1974 | Perez | |
| 4,095,833 A * | 6/1978 | Lewis | 294/82.3 |
| 4,118,060 A | 10/1978 | Brown | |
| 4,136,415 A | 1/1979 | Blockburger | |
| 4,148,514 A * | 4/1979 | McCullough | 294/82.34 |
| 5,271,128 A * | 12/1993 | Storm | 24/601.5 |
| 5,418,757 A | 5/1995 | Rau | |
| 5,513,886 A | 5/1996 | Cyr | |
| 6,379,202 B1 | 4/2002 | Liu | |
| 6,670,735 B2 | 12/2003 | Liu | |

* cited by examiner ized energy store allows AUVs and bed stations to
RELEASE APPARATUS FOR A LOAD ON A DEVICE AND UNDERWATER DEVICE The invention relates to a release apparatus for a load on a device, in particular an underwater device, and an underwater device having a release apparatus.

BACKGROUND OF THE INVENTION

Underwater devices are inter alia anchored bed stations or underwater vehicles such as AUVs ("Autonomous Underwater Vehicle") and ROVs ("Remotely Operated Vehicle"). These are used in many areas of marine research and observation, for example for inspecting oil platforms, ships, pipelines, for support when laying deep sea cables, in the search for underwater mines, for measuring salt concentration and for exploration and mapping of the oceans.

An integrated energy store allows AUVs and bed stations to work completely autonomously, i.e. without a connection to a supply ship. Both systems are used at depths of a few meters to a few kilometers under the water surface.

In the case of AUVs, the average mission duration is a few hours to a few days. If surfacing is no longer possible during a mission, for example owing to a functional fault or an energy loss, a device is needed with which it is possible for the AUV to be salvaged from the sea bed or out of the ocean. One possibility consists in providing an apparatus with which the AUV can reach the water surface independently. This can be achieved for example by separating a weight from the AUV, as this increases the buoyancy of the vehicle.

A similar concept is used when salvaging bed stations. The typical structure of such an underwater bed station includes floats, measurement devices, an acoustic release and a weight. If the measurements to be carried out have finished, or if the energy store of the measurement device is depleted, a signal is sent from the measurement device or a supply ship to the release, which then cuts the connection to the anchor. The measurement device reaches the water surface owing to the buoyancy of the float situated on the top of the overall structure.

The separation of an emergency weights or a float can be realised in different ways. Documents U.S. Pat. No. 3,228,332, U.S. Pat. No. 3,463,113, U.S. Pat. No. 3,577,950, U.S. Pat. No. 3,848,226, U.S. Pat. No. 4,118,060, U.S. Pat. No. 4,136,415, U.S. Pat. No. 5,418,757 and U.S. Pat. No. 6,379,202 each describe mechanical release mechanisms, which are used for example to salvage bed stations. In these cases, the anchor to be decoupled is situated on a hook system, which is opened by an actuator.

In the cited patents, the hook is shaped in such a manner that the hook is unlocked after activation of the actuator and is then rotated or opened owing to a force acting on the hook, which results from the buoyancy force of the float. The release mechanism and the anchor must be in a defined position with respect to each other for this purpose. This is defined by the weight force of the load acting towards the earth's centre and the buoyancy force of the float acting in the opposite direction. In the case of a tilted position, the release mechanism can therefore fail.

In the known apparatuses, the arrangement of the hook system and actuator with respect to each other is considered disadvantageous, as the floats pulling on the bed station act constantly on the hook-opening mechanism with some of their buoyancy force. When the apparatus is activated, the actuator must therefore overcome different amounts of static and dynamic friction at the connection point between the hook and anchor depending on the size of the float and thus the buoyancy force it produces. With greater buoyancy forces, the opening mechanism therefore needs more energy.

U.S. Pat. No. 3,358,254 discloses a further mechanical release mechanism for underwater bed stations, with which the anchor can be decoupled by freeing a locking bolt. The locking bolt is held in its position by a rod element connected to an actuator until it is activated. If the actuator is activated, the rod element is moved out of its rest position and the locking bolt is freed. The fixing of the rod element in the rest position appears to be critical in this case. This is achieved by prestressing the rod element by means of a spring. This connection means that the release mechanism can be provided with only a limited buoyancy force. If the force of the float in the release direction exceeds that of the spring, there is a risk that the apparatus is opened. The actuator must in this case also be designed correspondingly, as it must overcome the spring force acting against it in order to open.

A further possibility for the design of a release mechanism is described in U.S. Pat. No. 3,609,825. In this case the load is held axially on a cylindrical apparatus by means of balls. This apparatus contains a movable piston, which forms a pressure chamber with the apparatus on one side and is exposed to the surrounding medium on the other side. With increasing depth, the pressure exerted on the piston by the water increases, as a result of which the piston is moved and the volume of the pressure chamber is reduced. If the piston reaches the position in which the balls which hold the load can slip into the openings present in the piston, the load is free is falls out of the apparatus. The problem in this case is the static and dynamic friction, which arises between the balls and the cylinder moving axially therebetween. The friction increases with greater weight forces and counteracts the axial movement of the cylinder. Finally, the release of the load is also connected to the attainment of a minimum depth. The load cannot be ejected at any desired depth. This restricts the functionality of an underwater vehicle considerably.

U.S. Pat. No. 3,749,933 discloses a release mechanism for bed stations, which decouples the bed station from the anchor by unlocking a closure. The closure is connected to an actuator by means of a mechanical transmission system, which reduces the force exerted on the closure by the floats as far as the actuator. The problem in this case is the high number of mechanical components of the transmission system used, which are exposed directly to seawater. There is a risk that the functioning of the mechanism is adversely affected by suspended particles and growth of vegetation. Furthermore, the force acting on the actuator, the magnitude of which depends on the coupled floats, could impair the actuator or result in inadvertent release.

U.S. Pat. No. 6,670,735 describes a release mechanism for an underwater vehicle. The emergency weight is ejected in that an actuator turns a spindle, as a result of which a bayonet closure is opened and the weight is freed. Mounted between the closure and the actuator is a series of gears, which reduce the rotation speed of the actuator. Furthermore, the weight to be ejected includes depressions with springs, which are intended to ensure the ejection of the weight. In this apparatus too there is a direct connection between the actual actuator and the load to be decoupled. The load thus exerts a force on the actuator and the gear stages at any time. If the release mechanism is activated, the actuator must overcome the static and dynamic friction arising owing to the load on all the components between the load and the actuator.

All the above-mentioned release mechanisms have a direct coupling between the actuator used in each case and the load used. The forces acting thereby on the whole release mechanism result in static and dynamic friction, which causes an increased energy requirement of the actuator. The energy requirement can also increase owing to suspended particles and organic growth which become stuck in the mechanisms. A further problem arising from the coupling consists in that the force which must be applied by the actuator depends directly on the load, as the actuator must counteract some of the force produced by the load in order to keep the apparatus closed. The load and the actuator must therefore be matched to each other, and only loads with little variation in weight or buoyancy can be used.

A release mechanism in which decoupling of the forces is effected is described in U.S. Pat. No. 3,063,395. In this case the actuator must apply a defined force. This is used for starting a mechanism which, once started, runs independently and results in ejection of the load. The load is completely decoupled from the actuator owing to a corresponding structure. The separation of the load is effected by the tightening of a Bowden cable, which frees a prestressed spring. The spring drives a hammer, which hits a cutter, which cuts the holding cable of the load. In this case the very complex structure and the high number of movable parts are viewed particularly critically. This results in a great susceptibility to faults, which is further increased by the likely accumulation of organic growth and suspended particles.

Further release apparatuses are known, with which a hook is used to hang up the load and on which hook torques act when it is in its closed position, in particular from the load itself, which requires the provision of additional securing mechanisms to prevent unintended release. Such release apparatuses are disclosed for example in U.S. Pat. No. 1,035, 021, U.S. Pat. No. 4,136,415, U.S. Pat. No. 5,513,886 and FR 958,040.

SUMMARY OF THE INVENTION

The object of the invention is to create a release apparatus for a load on a device, in particular an underwater device, which has a compact and simple mechanism which can be released in a low-energy manner.

This object is achieved by a release apparatus for a load on a device, in particular an underwater device, according to independent claim 1. Furthermore, an underwater device having such a release apparatus is provided according to independent claim 13. Advantageous configurations of the invention form the subject matter of dependent subclaims.

The invention comprises the concept of a release apparatus for a load on a device, in particular on an underwater device, having a hook device, with which a hook is mounted on a hook-holding device such that it can rotate about a rotational axis and can be displaced between a closed and a released position by rotation about the rotational axis with the aid of a hook actuation mechanism, a load rest, which is formed on the hook and in which a holding element of the load rests when in the non-released state, and a restricted guidance device, which is configured to guide the load in an ejection direction when released, wherein, when the holding element of the load rests on the load rest, the hook in the closed position is torque-free with respect to a torque exerted by the load on the hook in relation to the rotation about the rotational axis.

With the release apparatus, a mechanism is provided for holding a load on a device, in particular an underwater device, and releasing it therefrom in a load-free manner when necessary, which mechanism has a simple mechanical structure and is cost-effective to produce. Compared to the prior art, the release apparatus has only a small number of individual components. The release apparatus is suitable for holding and ejecting loads of different weights. When the release apparatus is used in conjunction with an underwater device, the operation of the release apparatus is independent of the diving depth.

The hook actuation mechanism can in its various designs be configured to move the hook (only) out of the torque-free position, whereupon the hook is then displaced automatically, that is, without further support from the hook actuation mechanism, into the released position. Further support of the displacement of the hook by the actuation mechanism can however also be provided.

The torque-free mounting of the hook with the load resting on it in the closed position prevents unintended self-release of the release apparatus. Hooks of any desired shape can be used, for example also hooks with an S-shape.

The restricted guidance device is configured to guide the holding element of the load and/or a section of the load itself in the restricted guidance device.

With suitable design of the holding element, for example by means of rounded surfaces, the load rest is formed as a rest point on the hook in one embodiment.

A development of the invention can provide for a connection line between the rotational axis and the load rest to be formed substantially parallel to the ejection direction.

A preferred development of the invention provides for the restricted guidance device to be formed at least partially in the hook-holding device.

In an expedient configuration of the invention, it can be provided for the restricted guidance device to be formed with a groove running in the ejection direction.

An advantageous embodiment of the invention provides for the hook-holding device to be configured to guide the hook during displacement between the closed and the released position, for example by means of lateral guidance. In this embodiment, for example lateral surfaces of the hook are guided on associated surfaces of elements of the hook-holding device during displacement between the closed and the released position. For example, the elements are formed as upright plates, between which the hook is arranged.

A development of the invention preferably provides a release support device, which is configured to provide a supporting ejection force with a force component which acts parallel to the ejection direction. It can be provided for the release support device to be configured to develop a force effect substantially exclusively in the ejection direction. For example, the release support device is formed with a spring force mechanism which provides the supporting ejection force.

In an advantageous configuration of the invention, it can be provided for the release support device to be formed to act on multiple sides of the restricted guidance device. In this case, it can be provided in one embodiment for the force effect to be provided on opposite sides of the restricted guidance device. A symmetrical provision of force with respect to the restricted guidance device is particularly preferred.

A development of the invention can provide for the hook actuation mechanism to be configured to displace the hook out of the closed position by the application of compressive force. In this case it can be provided for the hook to be displaced into the released position by means of the hook actuation mechanism. Alternatively, a hook actuation mechanism is formed with which the hook is displaced by means of tensile force.

A preferred development of the invention provides for the hook actuation mechanism to be formed with a retaining mechanism, which provides a retaining force for an actuation device acting on the hook. The retaining mechanism in particular effects a type of securing of the hook in the closed position in one configuration. If the actuation device is for example formed with a component which produces compressive force, for example a compressive spring, the retaining mechanism provides a counterforce to the compressive force acting on the hook in the closed state.

In an expedient configuration of the invention, it can be provided for the retaining mechanism with at least one retaining device to be selected from the following group of retaining devices: melting device, electromechanical actuator and holding device with ignition mechanism. The melting device is for example a corrosion-free wire, to which a pulse of current can be applied so that the wire melts in order to bring about the release. The release mechanism is freed thereby. In another embodiment, the melting device is formed with a wire of defined corrosion resistance, that is, a wire which corrodes in a defined manner so that the load is then released. In this manner the load is released in a completely energy-free manner. If the release apparatus is for example used in conjunction with an underwater device, a wire thickness can be calculated in advance depending on the water properties at the site of use, for example the salt content, which after a defined time is weakened to such an extent that the release apparatus is released.

One advantageous embodiment of the invention provides for a stop for the holding element of the load and/or the load itself to be formed with the hook-holding device. In one configuration, the holding element of the load can thereby be fixed between the rest on the hook and the stop (105) in the closed position of the hook.

A development of the invention preferably provides a load guide, which is configured to interact with a section on the load itself in a manner guiding the same when the load is released and/or coupled. It is for example provided in one embodiment for surface sections on the release apparatus and/or the device receiving the latter to interact with associated surface sections on the load and/or holding element of the load in such a manner that the associated surface sections slide on each other during release/coupling so that a guide is provided. In one embodiment, the associated surface sections can comprise obliquely or conically running surface sections.

DESCRIPTION OF PREFERRED EXEMPLARY EMBODIMENTS OF THE INVENTION

Figure 2:
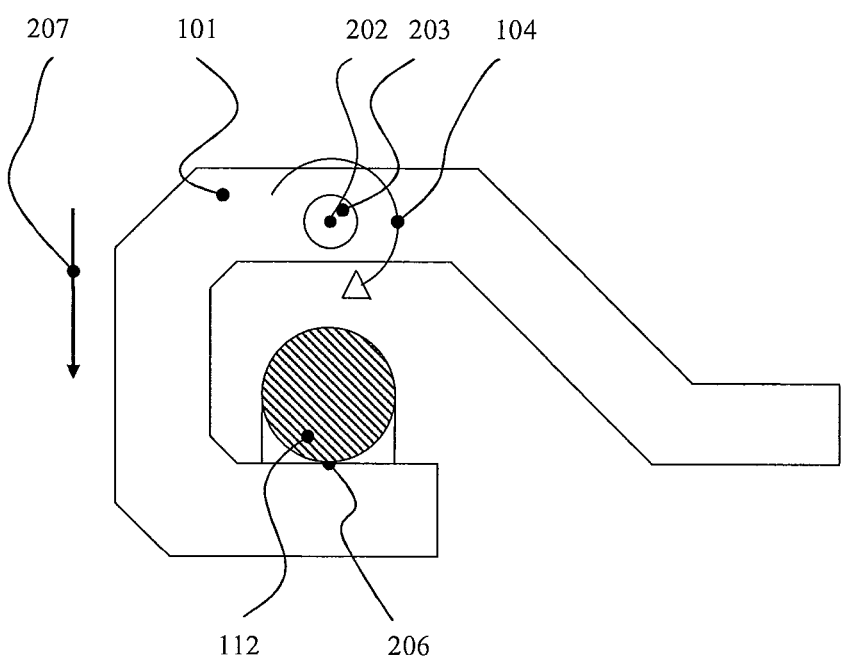
Figure 3:
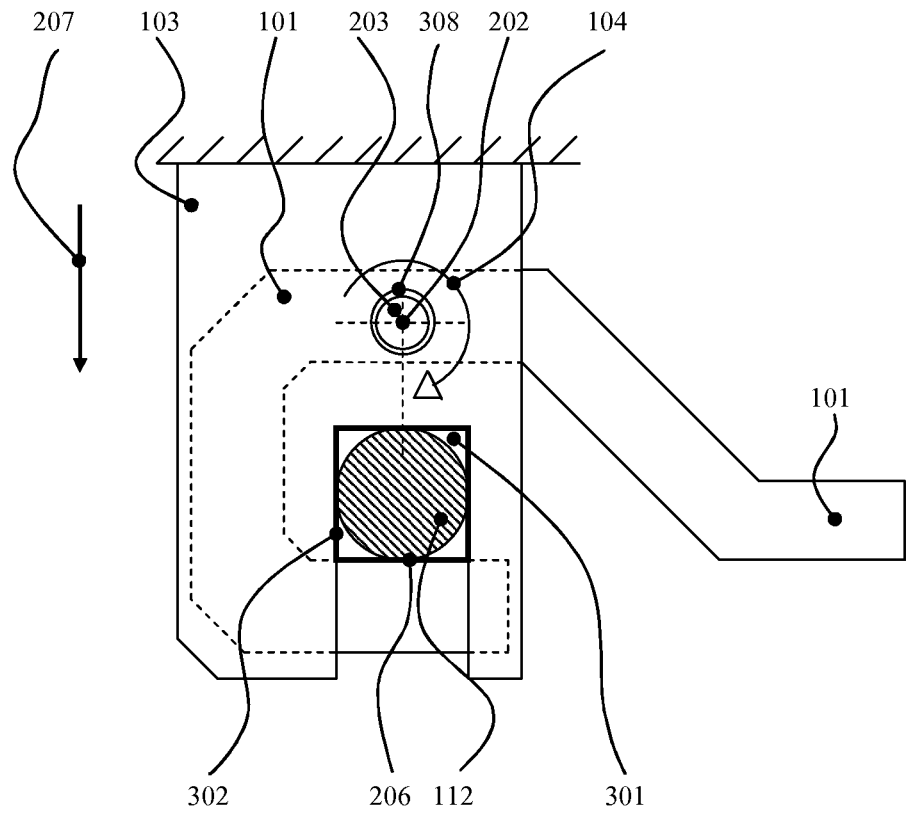
Figure 4:
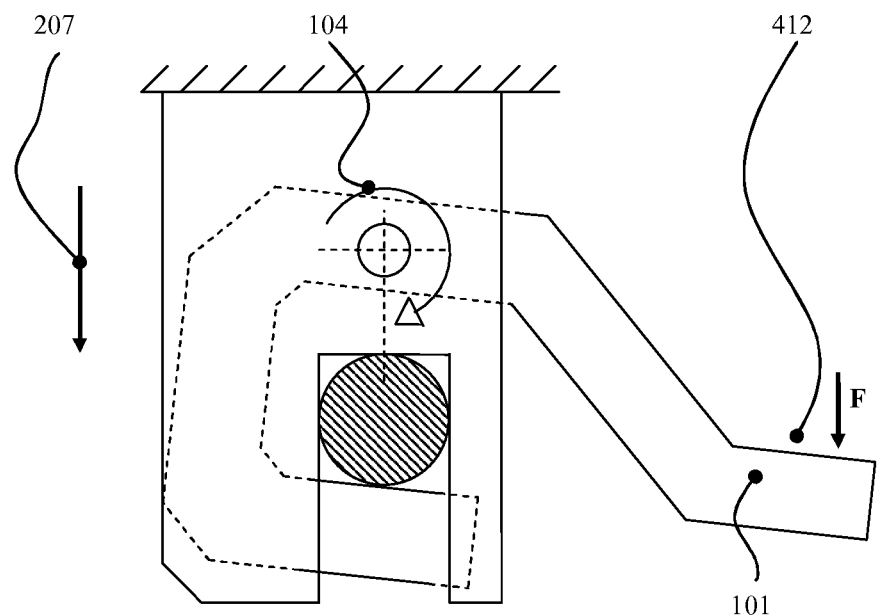
Figure 5:
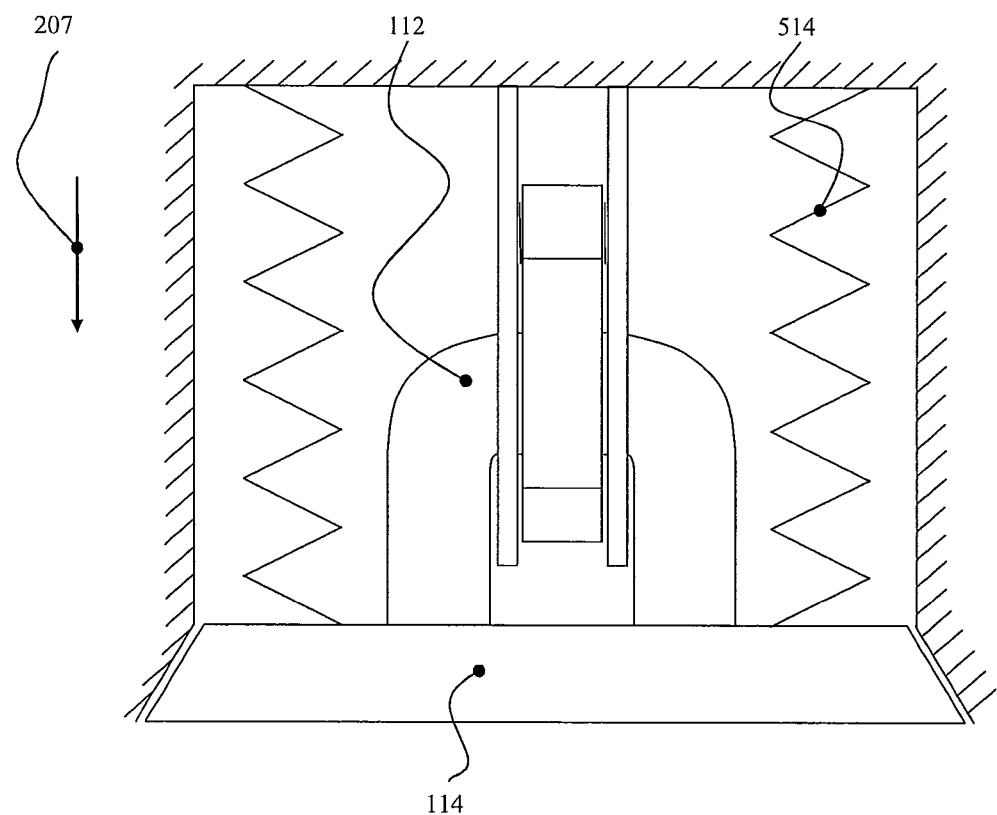
Figure 6:
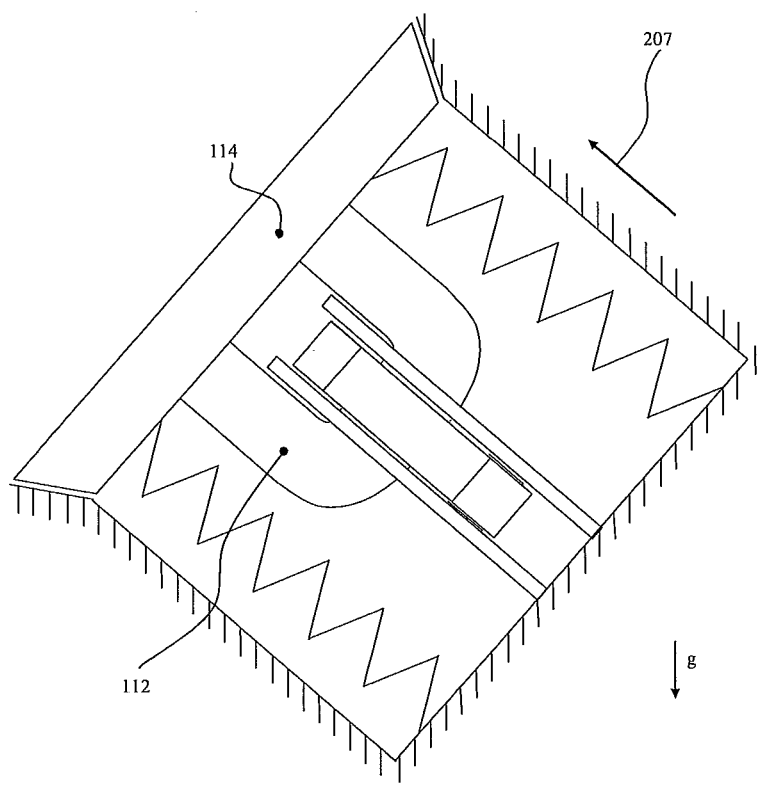
Figure 7:
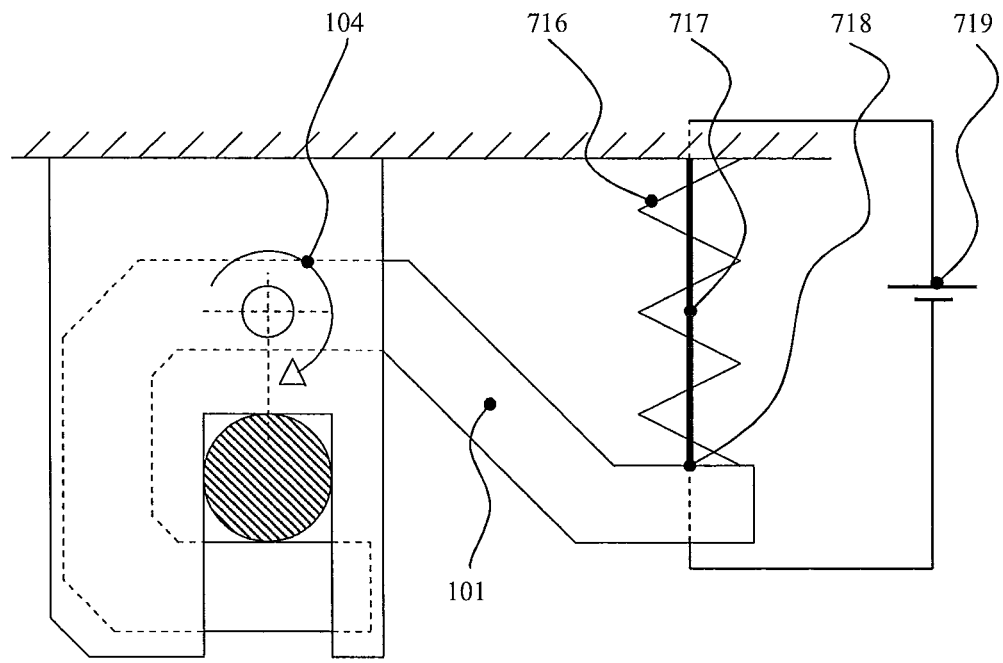
Figure 8:
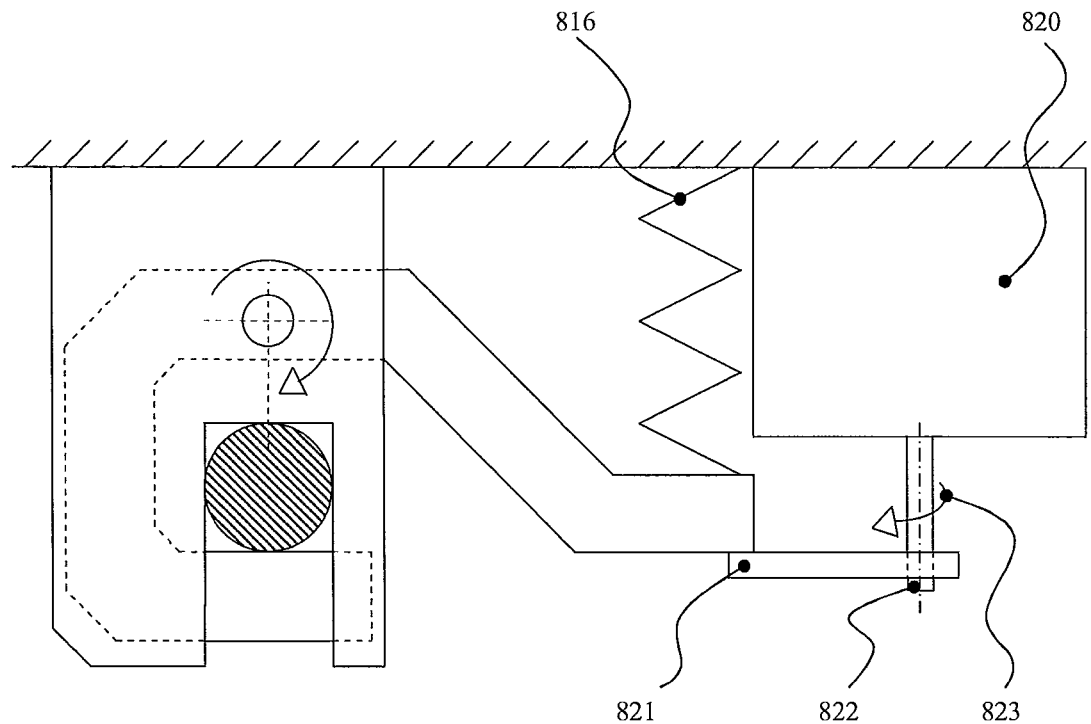
Figure 9:
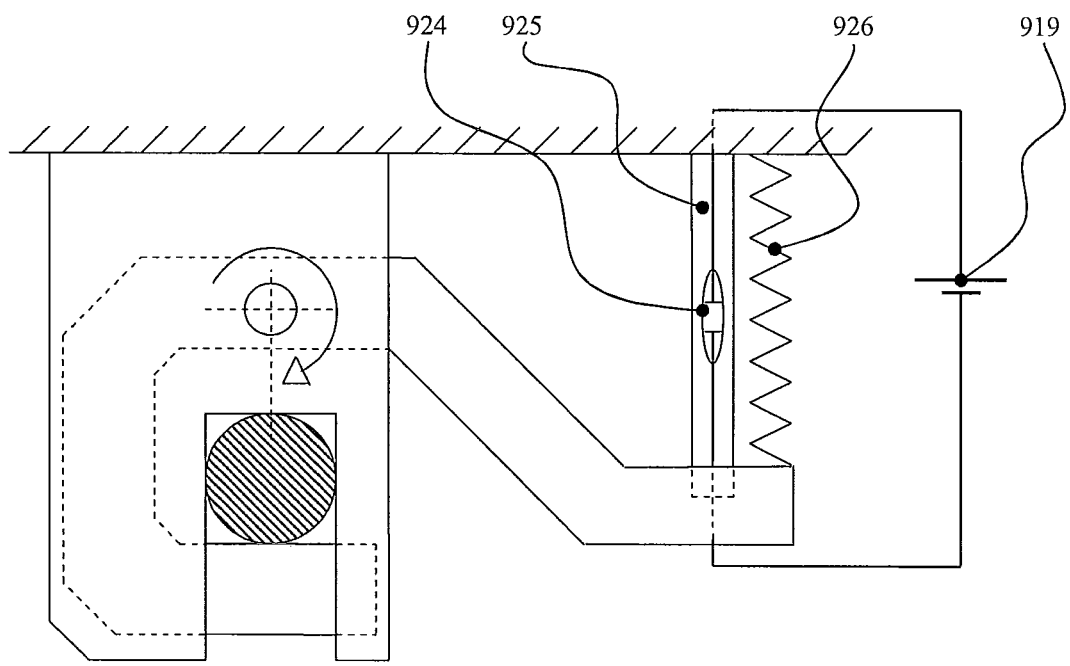

The invention is explained in more detail below using preferred exemplary embodiments with reference to figures of a drawing. In the figures:

FIG. 1 shows an isometric diagram of a release apparatus,

FIG. 2 shows a load-bearing hook of the release apparatus of FIG. 1 from the front, FIG. 3 shows a section of the release apparatus of FIG. 1 from the front, with the hook in the closed position, FIG. 4 shows the section of the release apparatus of FIG. 3 in which the hook is actuated and has left the closed position, FIG. 5 shows a schematic diagram of a further release apparatus in which a release support device is provided with compressive springs, FIG. 6 shows a schematic diagram of the further release apparatus of FIG. 5 in an oblique position, FIG. 7 shows a schematic diagram of a release apparatus in which a hook actuation mechanism is formed with a compressive spring and a melting device, FIG. 8 shows a schematic diagram of a release apparatus in which a hook actuation mechanism is formed with a compressive spring and an electromagnetic actuator, and FIG. 9 shows a schematic diagram of a release apparatus in which a hook actuation mechanism is formed with a compressive spring and a bolt and an explosive charge accommodated therein.

FIG. 1 shows an isometric diagram of a release apparatus. A hook 101 is held with the aid of a hook-holding device, which comprises lateral plates 102 and 103. In this manner the hook 101 is mounted rotatably. The hook is in the closed position in the diagram of FIG. 1. A holding element 112 configured as an eyelet on a load 114 to be held is held by the hook 101 and prevented from being detached.

FIGS. 2 to 4 show schematic diagrams of elements of the release apparatus of FIG. 1.

A mounting and rotation point 202 of the hook 101 formed by means of a shaft 203 lies on a line with a hook rest point 206 of the eyelet, which forms the holding element 112 for the load 114. This connection line (a spatial reference element) is parallel to an ejection direction 207 and a groove 310. This ensures that the force acting on the load 114 cannot exert any moment on the hook 101 via the eyelet 112, so the hook does not rotate.

The hook 101 is mounted between the two plates 102, 103. On the right-hand plate 103, this is done via the shaft 203 with a corresponding bearing 308, for example with plastic bearings for underwater applications. Both plates 102, 103 are connected to each other in order to prevent rotation and have an open, for example rectangular opening 301 at their end in the ejection direction 207. The opening 301 with the hook 101 forms a closed profile 302 in which the eyelet 112 is fixed in the closed state of the apparatus. The profile 302 is formed such that the connection line between the rest point 306 of the eyelet 112 inserted here and the rotational axis of the hook 101 is aligned parallel to the ejection direction 207 of the load 114. The structure is designed such that no displacement can occur between the above-mentioned points. Regardless of the alignment of the apparatus in relation to the forces acting on the load 114, the load 114 cannot therefore exert any force on the opening mechanism, that is, the hook 101 is not set in rotation and the apparatus cannot open itself.

To open the apparatus, a torque is needed which rotates the hook 101 about its bearing point in the rotation direction 104 and thus moves it out of the torque-free position, for example by means of a force F at the point 412 in FIG. 4, which acts in the ejection direction 207. By rotating out of its starting position, a force component also acts on the hook 101 in the direction of the gravity moving the load 114, which increasingly promotes the hook opening and ultimately results in the eyelet 112 and thus the load 114 fastened thereto being able to escape from the apparatus when the openings of the lateral plates 102, 103 are open. In the case of assembly in the reverse order, a float can only become detached when the force is effective offset by 180° on the hook 101.

So that the separation of the load 115 from the apparatus is also possible in different positions of the apparatus or underwater device on which the apparatus is mounted (cf. FIG. 6, possible oblique position), a force must act in the direction of the groove opening in addition to a gravitational or buoyancy component, for example caused by compressive springs 514, so that "ejection" in the ejection direction 207 is possible independently of the weight or buoyancy force acting in any direction. Tilting of the load 114 in the guide can be prevented by a suitable guide and a corresponding structure of the load 114, for example bevelled guide walls and a round, trapezoidal load.

If gravity and the force of the "ejection springs" counteract each other, another buoyancy component is necessary for further releasing the weight.

The whole concept has the advantage that a wide range of loads of different weights can be hung on the hook 101 without the energy required for release, i.e. freeing of the load 114, increasing. Furthermore, no parts of the apparatus are ejected with the load 114, so reuse is easily possible.

FIGS. 7 to 9 show some different variants for moving the hook 101.

One preferred variant provides a compressive spring 716, which applies the torque for opening by means of a compressive force at the point 718 of the apparatus. In the closed state, a wire 717, for example a titanium wire, prevents opening of the apparatus. Its structure is weakened by Joule heating by means of a brief pulse of current via the wire 717, for example by discharge of a capacitor or another energy source 719, so that it yields under the force of the compressive spring 716 and the compressive spring 716 opens the apparatus, as a result of which the load 114 is freed. A great advantage of this structure is that a suitably selected wire yields under the influence of seawater after a certain time and thereby releases the load 114 even in the event of total energy failure.

A further preferred variant provides an electromechanical actuator 820. In this case a retaining mechanism prevents the apparatus from being opened by the compressive spring 816 with a lever 821, which is fastened to the shaft of an electromotor or electromagnetic rotary relay 822. If the rotary actuator is supplied with energy and thus the pin moves out of its starting position in the direction 823, the hook 101 rotates about its bearing point owing to the compressive spring, and the apparatus is opened.

Another variant uses the mechanical compressive spring 926 and a retaining mechanism with a plastic bolt 925 and a small ignition capsule 924 in the centre thereof, which brings an easily flammable material to exothermic reaction by means of an electrical pulse from the energy source 919, as a result of which the hook 101 is set in rotation and the apparatus opens.

The features of the invention disclosed in the above description, the claims, and the drawing can be of significance individually as well as in any combination for the implementation of the invention in its different embodiments.

The invention claimed is:

1. A release apparatus for a load (114) on a device comprising:
    a hook device, with which a hook (101) is mounted on a hook-holding device such that it can rotate about a rotational axis (202) and can be displaced between a closed and a released position by rotation about the rotational axis (202) with the aid of a hook actuation mechanism,
    a load rest (206), which is formed on the hook (101) and in which a holding element (112) of the load (114) rests when in the non-released state, and
    a restricted guidance device, which is configured to guide the load (114) in an ejection direction (207) when released,
    a release support device, which is configured to provide a supporting ejection force with a force component which acts parallel to the ejection direction (207), wherein, when the holding element (112) of the load (114) rests on the load rest (206), the hook (101) in the closed position is torque-free with respect to a torque exerted by the load on the hook (101) in relation to the rotation about the rotational axis (202), wherein the load rest (206) is arranged below the rotational axis (202) about which the hook (101) can rotate.

2. The release apparatus according to claim 1, characterised in that a connection line between the rotational axis (202) and the load rest (206) is formed substantially parallel to the ejection direction (207).

3. The release apparatus according to claim 1, characterised in that the restricted guidance device is formed at least partially in the hook-holding device.

4. The release apparatus according to claim 1, characterised in that the restricted guidance device is formed with a groove running in the ejection direction.

5. The release apparatus according to claim 1, characterised in that the hook-holding device is configured to guide the hook (101) laterally during displacement between the closed and the released position.

6. The release apparatus according to claim 1, characterised in that the release support device is formed to act on multiple sides of the restricted guidance device.

7. The release apparatus according to claim 1, characterised in that the hook actuation mechanism is configured to move the hook (101) out of the closed position by the application of compressive force.

8. The release apparatus according to claim 1, characterised by a load guide, which is configured to interact with a section on the load (114) itself in a manner guiding the same when the load (114) is released and/or coupled.

9. An underwater device having a release apparatus according to claim 1.

* * * * *